Stetson & Maynard.
Mower.
Nº 24,063. Patented May 17, 1859.
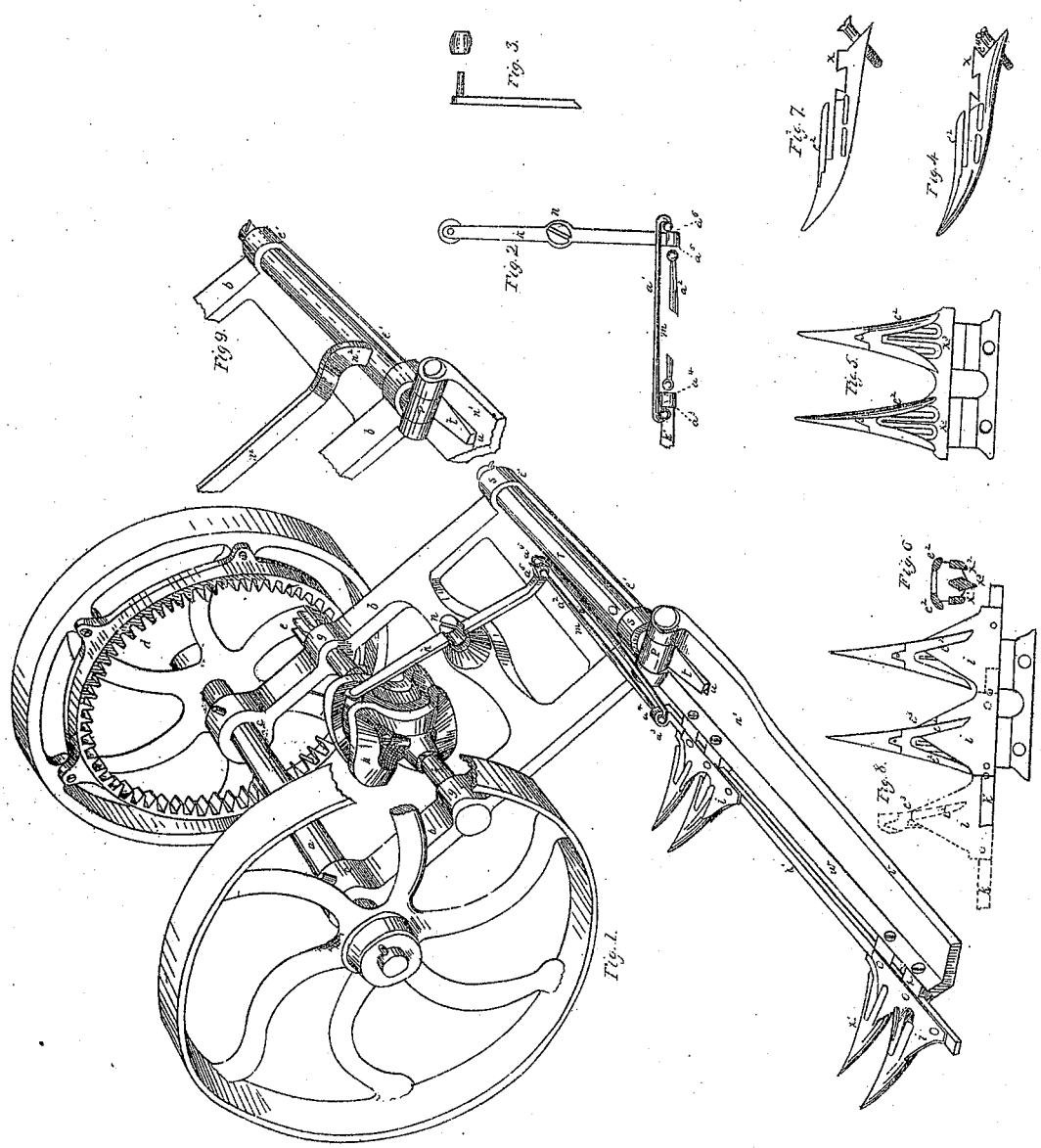

UNITED STATES PATENT OFFICE.

W. S. STETSON AND R. F. MAYNARD, OF BALTIMORE, MARYLAND.

IMPROVEMENT IN HARVESTING-MACHINES.

Specification forming part of Letters Patent No. 24,063, dated May 17, 1859.

*To all whom it may concern:*

Be it known that we, W. S. STETSON and R. F. MAYNARD, of Baltimore, in the county of Baltimore and State of Maryland, have invented certain Improvements in Harvesters; and I do hereby declare that the following is a full, clear, and exact description of the principles or characters which distinguish them from all other things before known, and of the usual manner of making, modifying, and using the same, reference being had to the accompanying drawings, of which—

Figure 1 is a perspective view of the machine; Fig. 2, a detached view of the connecting-rod; Fig. 3, a detached view of that end of the lever $k$ which runs in the cam-groove and the friction-roller on the end of the lever; Fig. 4, a side elevation of one of the fingers or teeth; Fig. 5, a plan view, showing two teeth or fingers in one section or division; Fig. 6, a cross-section through the middle of one of the fingers; Fig. 7, a side elevation of one of the fingers, with an obtuse angle at its base; Fig. 8, a top view of knives and fingers, showing by red and black lines the range of motion or length of stroke given to the knives, and Fig. 9 is a detached view in perspective, showing the connection of the lever for adjusting the finger-bar.

Our invention consists in certain improvements in harvesters, described and specified as follows:

Upon the axle $a$ of the carriage-wheels is hung a saddle-frame, $b$, by the collars $c$ $c$, in such manner as to vibrate about the axle. The lower end of this frame rests and runs upon the ground upon a rounded heel, $e'$.

$d$ is the crown-gear which drives the pinion $e$, and upon the pinion-shaft $f$, which runs in the boxes $g$ $g$ in the saddle-frame, is a double spiral cam, $h$, the office of which is to give reciprocating motion to the knives $i$ through the medium of the vibrating lever $k$ and the connecting-rod $m$. The fulcrum $n$ of lever $k$ is in the center of the lever, thus giving to the knives the same length of stroke as the vibration of the cam, which obviates to a great extent the jarring and rough working so common in the cam movements used in harvesters, where large cams are used on the driving-wheels as the primary gear.

The connecting-rod $m$ is of a peculiar construction and specially adapted to convey motion from the cam-lever to the cutter-bar, and is found preferable on some accounts to a single rod with ball-and-socket or universal joints at its ends. It consists of two rods, $a'$ $a^2$, and four sockets, $a^3$ $a^4$ $a^5$ $a^6$, two in the end of the vibrating lever $k$ and two in the end of the cutter-bar $k'$. These sockets are to receive the balls or rounded heads on the ends of the rods $a'$ $a^2$. The rod $a'$ has its ends bent inward, as shown in Fig. 2, and the rod $a^2$ is straight. When the balls on these rods are in their respective sockets, according to their position shown in Fig. 1, it will be seen that they act together as one rod, while there is sufficient freedom of motion in the joints to accommodate the various motions of the cutter-bar and finger-bar.

The finger-bar $n'$ rests upon the ground, and has all the necessary motions of adjustment and accommodation to unevenness of the ground given to it by the very simple and efficient connections with the saddle-frame shown in Fig. 1. It adapts itself to slopes of the ground by means of the hinge-joint $p$, and is adjustable as to height of cut by its motion about the axis of the shaft $r$. The shaft $r$ turns in the collars $s$ just above the heel of frame $b$, and is prolonged so as to make the support or axis of the hinge-joint $p$. It is also prolonged beyond this joint into the brace-piece $t$, which lies in a slot or opening, $u$, in the finger-bar and acts as brace to the hinge-joint $p$. The finger-bar $n'$ is of a particular form. (Shown in in Fig. 1.) The rear portion, $v$, rests flat upon the ground, and the forward part, $w$, rises from the part $v$ at an angle of forty-five degrees, or thereabout. The front upper edge of $w$ is shown as inclined in Fig. 1, so as to fit the right angle $e^4$ at the base of the tooth; but for facility of casting we prefer to make it perpendicular, as shown in Fig. 7, the mechanical effect of bracing the tooth being the same in both cases, and this edge and the under surface of $w$ are embraced by the base of the fingers $x$, which are of the forms shown in Figs. 4 and 7. A large bearing-surface is thus gained, and when the fingers are bolted to the bar they are very firm, the direction of the bolt being shown in Fig. 4.

Instead of constructing and attaching the fingers separately or in a whole set, we make them in divisions or sections of two or more, Fig. 5, by which we combine a sufficient amount of firmness with facility of attachment or removal in putting up the machine or in case of repairs, and also facility of casting the fingers. We make two openings, $x'$ $x^2$, of the form shown in section in Fig. 6, through the lower part of the fingers, and the upper edges of these openings form shearing or cutting edges.

We are aware that an opening has hitherto been made through the finger; but by means of the two openings we gain two additional shearing-edges, the two middle ones on the upper edge of division $x^3$ being the most efficient, in conjunction with the back-and-forth motion of the knife-edges, in cutting up or reducing and clearing away gummy matter and the refuse stuff, which tends constantly to clog and impede the motion of the knives. The fingers are also lighter without losing any material portion of strength. We divide the finger-guard into two portions, $e^2$, and each of these portions is made concave on the under side, as shown in Fig. 6, and they are inclined so as to bring their outer edges near to the knives, while their inner edges are elevated. This form and the inclination of the divisions of the guard are attended with great advantages in respect to keeping the knives clean and removing all obstructions to their motion, and at the same time the weight is lessened without detracting from their necessary strength.

Another important feature of our harvester, in connection with the open tooth and its cutting-edges, is making the stroke of the knife-bar of such length that the knife-points $e^3$ shall pass the distance from the outside edge of one tooth to the outside edge of the adjacent tooth, as shown by the red lines in Fig. 8, by which means the knife-edges cut over the edges of two teeth, and also pass over the middle cutting-edges, which keeps the knives and teeth very clean of gummy matter and obstructions and makes a very efficient cut. The adjustment of the finger-bar is effected by means of the lever $n^2$, connected with the axis $r$, as shown in Fig. 9.

We claim—

1. The double hinge-joint at the end of the finger-bar, consisting of the hinge $p$, shaft $r$, collar $s$, and brace $t$, arranged and operating in the manner described, for the purpose specified.

2. The compound connecting-rod $m$, constructed and operated as set forth.

3. We do not claim attaching the fingers or teeth to an angle-iron bar, as that has been before done; but we do claim so constructing or forming the upper part of the obtuse-angle-iron tooth-bar and the base of the finger or tooth that said base shall bear upon two plane faces of the said angle-iron, in the manner and for the purposes set forth.

W. S. STETSON.
R. F. MAYNARD.

Witnesses:
ROB SINCLAIR, Jr.,
DANL. SCULLY.